April 17, 1956  H. S. ALLISON  2,741,885
BANDING WITH THERMOPLASTIC
Filed Dec. 8, 1952
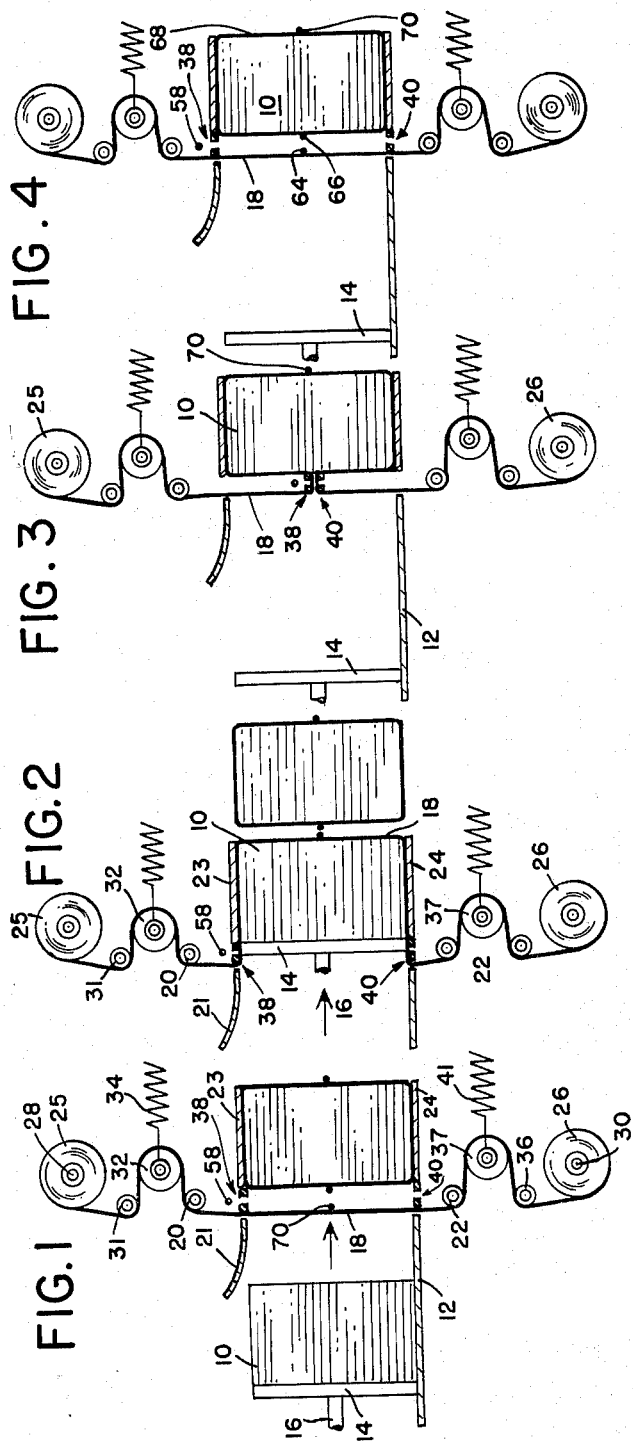
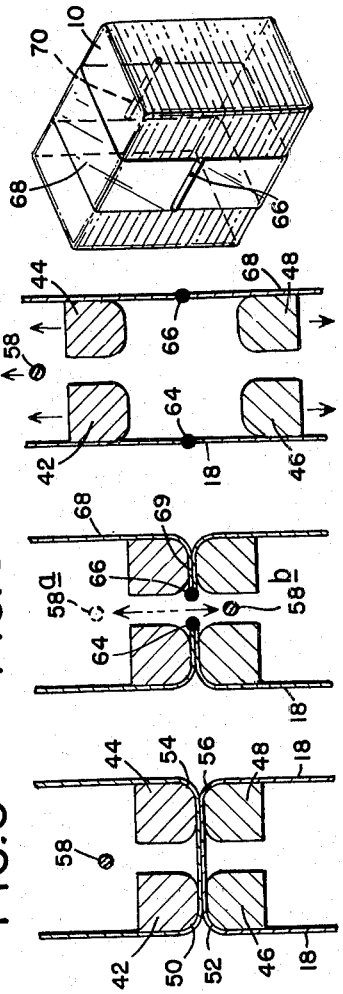
INVENTOR
HERBERT S. ALLISON
BY William C. Strieber ATTORNEY

United States Patent Office 2,741,885
Patented Apr. 17, 1956

2,741,885

BANDING WITH THERMOPLASTIC

Herbert S. Allison, Minneapolis, Minn., assignor to General Mills, Inc., a corporation of Delaware Application December 8, 1952, Serial No. 324,676

2 Claims. (Cl. 53—198)

The present invention relates to improvements in methods and apparatus for banding by drawing an encircling band around an object or a stack of objects and sealing the band tightly to secure the objects together.

In the banding of stacks of objects such as envelopes, papers, separate packages and the like, a band made of the thermoplastic material possesses certain advantages over ordinary bands formed of paper. Thermoplastic such as polyethylene, rubber hydrochloride, and others which are commercially available are moistureproof and will not soften when subjected to water to tear and release the banded objects as will paper or similar material. Further the thermoplastic material has greater strength than ordinary paper and is capable of scuffing abuse and rough usage and can be drawn more tightly around the banded objects without tearing. Certain thermoplastic materials have an innate elasticity which keeps the band taut around a group of objects even though stress is placed on the band.

Thermoplastic material has one other important advantage in that it can be readily joined at its ends or to other thermoplastic by the mere application of heat. If material such as paper is used as a banding material, the band must be sealed by an adhesive positioned between layers and the band must be overlayed at the point where the seal has been made. In mechanical sealing additional mechanism must be provided for glue application and time must be allowed for the glue to set.

In the present invention applicant has provided a way to utilize the heat sealing property of thermoplastic by joining the band with a seam formed by a weld between the ends of the band. With applicant's invention this not only saves time as the weld can be made instantaneously, it also saves material and then no overlap is necessary, the ends being in effect butt welded together.

In ordinary banding with a thermoplastic material it is necessary to first wrap the banding material around the object to be sealed by bringing the end completely around the object and drawing the band tight as wrapping the object in the band. With the object banded the heat seal is then formed and the sealed band is severed from the supply of material. These steps must be repeated each time a new bundle of objects is banded.

An object of the present invention is to provide a method by which a band of thermoplastic material may be drawn tightly around a stack of objects and heat sealed at its ends to provide a moisture repellant tough durable band using no more material than the actual length of the band.

It is another object of my invention to provide a mechanism and method which will make it possible to successively band series of stacked objects without unnecessary delay between stacks and which makes it necessary to wrap the band end completely around each stack and ends the necessity of cutting the band from the supply of material by a separate step.

It is still another object of my invention to provide a method which is adaptable to use with an extremely simple mechanism and which can be used to band stacks of materials without provision of expensive, bulky and unwieldy apparatus.

Other objects and advantages will become apparent in the following specification taken in connection with the accompanying drawings, in which:

Figure 1 is a side elevation shown schematically of an apparatus embodying the principles of the invention for drawing and securing a band around a stack of objects;

Fig. 2 is another view of the mechanism of Fig. 1, showing a previously banded stack being pushed out and a succeeding stack being prepared for banding;

Fig. 3 shows the mechanisms of Figs. 1 and 2, with the band being drawn tightly around the stacks of objects and a seam being formed;

Fig. 4 is a side elevational view of the apparatus of Figs. 1, 2 and 3 showing the band having been completed and the mechanism ready for banding a succeeding stack of objects;

Fig. 5 is an enlarged detailed sectional view showing the clamps for forcing the ends of the thermoplastic together and the heated sealing wire for forming the seam;

Fig. 6 is another view of the apparatus of Fig. 5 showing the seam having been made;

Fig. 7 is another view of the apparatus of Figs. 5 and 6 showing the clamping means retreating after the seam has been made; and Fig. 8 shows the stack of objects with the band drawn tightly around the stack and seamed.

Figs. 1 through 4 show the apparatus for forming a band around the stack of objects, the figures being arranged in the sequence that the band is formed. The band may be a strip of material of any suitable width and, as shown in Fig. 8, is of sufficient width to hold the objects together. The principle of banding taught by this invention, however, may be used in a strip of wider width and could be utilized in a strip wider than the objects to be banded in a process of completely wrapping the objects.

The process may be used to band various objects such as a stack of flattened bags 10 or similar items, or the object banded may be a single solid object, or it may be also a group of objects of irregular shape.

The stack of bags 10 rests on a support 12 and is pushed along the support by a vertical pusher plate 14 which holds the edge of the objects even keeping the stack straight.

The pusher plate is carried on a rod 16 and is moved at the appropriate time to push the envelopes along the support 12. The banding material which is to be drawn around the stack of bags is shown at 18 being of a continuous length and stretched vertically between guide rollers 20 and 22. The band is held in this position in order that the stack of bags or objects may be pushed against it in the manner shown in Fig. 2.

To push the objects against the band and bring the band around three sides of the stacked objects, the pusher 14 is moved forward carrying the stack 10 against the band 18. The stack slides beneath a curved guide 21 to depress it in case the objects to be banded are resilient. The stack is pushed between the upper and lower guide plates 23 and 24 carrying the strip of banding material ahead of it. This draws the banding material up the back side of the stack of objects and across the top and across the bottom of the stack.

In order that the strip of banding material will freely feed to be drawn around the stack of objects it is supplied from freely rotatable rolls 25 and 26. These rolls are carried on axes 28 and 30 which are freely rotatable but which in some instances may have a brake or a similar retarding means to prevent them from coasting. The continuous length of material which is supplied off the rolls just described is held across the path of the objects. To start such a continuous length, two separate rolls of material may be taken and their ends joined together to make one continuous length.

From the top roll 25 the material is fed and passes over a roller 31 and then down over a tensioning roller 32 which draws against the material to remove all slack. To accomplish this end, a tension spring 34 pulls against the axis of the roll which is free to move this drawing the material tight. The same arrangement is followed at the lower end with the material being fed off the roll 26 up over a roller 36 and over a second tensioning roller 37. This tensioning roller again pulls against the material to remove the slack by virtue of the tension spring 41 being attached to its axis which is free to move.

Thus it is seen that when the stack of bags to be banded is pressed against the banding material it feeds freely from the top and bottom rolls to be drawn across the rear of the stack and over the top and beneath the bottom. The rollers should be regulated so as to feed an equal amount of material from both the top and the bottom although this is not absolutely necessary and the mechanism will operate although most of the material is drawn from one roller or the other.

After the material which forms a band is drawn around the stack of bags the material is brought across the front of the stack of objects to completely encircle the bags and complete the band. This may be done by either bringing the material down from the top side to join the material at the lower side, or by bringing the lower side up, or preferably as in the case shown by bringing the material from both top and bottom together to meet at the center of the stack. The apparatus shown for accomplishing this is in the form of upper and lower clamping bars 38 and 40. These bars, until the time they are needed to draw the banding material together, reside at the top and the bottom of the stack, being in the plane of the upper and lower guide plates 22 and 26. In this position they will not interfere with the passage of the material as it is pushed into position between the guide plates for banding.

Each of the clamping bars consists of two separate bars, the upper bars being numbered 42 and 44 and the lower bars being numbered 46 and 48, as shown in enlarged detail in Figs. 5, 6 and 7. The outer bars numbered 42 and 46 of both the upper and lower sets have rounded edges to provide a guide over which the material is drawn as the stack of bags is pushed into position for banding. The lower corner 50 of the upper bar and the upper corner 52 of the lower bar are rounded so that the material will easily draw over them.

The bars are brought tightly together to clamp the material together in the manner shown in Figs. 3 and 5. The inner edges 54 and 56 of the bars 44 and 48 are also rounded so as not to damage the material as they are brought together since they draw the band securely around the stack of objects. The bars are spaced from each other as shown in detail in Figs. 5, 6 and 7 to provide passage for a heated severing and sealing wire 58 which passes between them to form the seam at the ends of the banding material to complete the band.

To form the seal, the wire is suitably heated such as by passing an electrical current through it. It is moved from the upper position of Fig. 6, numbered 58a, to the lower position 58b. As the wire engages the thermoplastic material, it softens it, cutting the material. As the wire passes through the material it simultaneously cuts and welds together the severed edges forming two welded beads, the beads being shown at 64 and 66 of Fig. 6. The bars are preferably of metal for conducting away the heat.

Bead 66 is the seam which completes the banding of the material around the stack of objects and joining the cut edges of the band. The completed band 68 is now around the stack of material. The bars then move away from each other to release the material. The width of each of the bars is relatively small although Figs. 5 through 7 show them enlarged for purposes of illustration. Therefore, the fold of material 69 clamped between the bars is not sufficient to cause any appreciable slackening of the band when it is released. Bead 66 extends across the material and forms a secure seam which is relatively inconspicuous and which has used up no extra material such as would be necessary if an overlap seam were used. The seam 64 which is formed between the two severed ends of material supply again presents a continuous strip 18 for banding the next stack of bags. This seam will be on the back of the next banded stack as is illustrated by the seam 70 of Fig. 8 which was formed when the previous stack was banded.

Thus no preparation of the material is necessary for banding each stack of objects, the banding material having been cut and made continuous with the same operation that seals the band around the stack. The seam which is left across the continuous length of material is small and inconspicuous and will not weaken the strength of the material. The seam will also not obliterate any printing on the band if the banding material has printing on it for commercial purposes.

Thus it will be seen that the band is drawn around three sides of the stack of objects in an easy continuous stroke without necessitating passing the end around the stack. No time is wasted in preparing the band to receive the succeeding objects as the heated wire which has formed the seam for the band has also prepared the continuous length of the band by sealing together the cut ends in one stroke. The heated wire which is used for seaming is the preferred welding and cutting means although other heated means may be used which would serve to both cut and form welded seams on the separated edges of the material. The method herein taught is susceptible of use with stacks of objects of any size and is well adapted to forming bands around objects or stacks of objects of irregular shape because the band will always be drawn taut around the objects. When used with a stack of loosely packed objects such as envelopes, the ends of the banding material being drawn together, can press the stack together and thus hold it compressed until the seam is made. If with the apparatus shown, the band is to be drawn more tightly about the stack of objects a tensioning device may be placed on the edge of the upper and lower rollers and the band will be very tight when drawn together by the clamping means.

In some cases it may not be ncessary to provide a clamping means and the heated severing and sealing wire may be used cold to draw the loops of material together. When the materials are in contact the wire may be heated to cut the band and form the seam.

The method of banding here shown is readily adaptable to use in a completely automatic machine or to use in semiautomatic or manually operated mechanisms. Various adaptions will be readily apparent to cover various situations and needs.

I have, in the drawings and specification, presented a detailed disclosure of the preferred embodiment of my invention, but it is to be understood that as the invention is susceptible of modifications structural changes and various applications of use within the spirit and scope of the invention, I do not intend to cover all modifications, changes and alternative constructions and methods falling within the scope of the principles taught by my invention.

I claim as my invention:

1. Apparatus for banding stacks of objects comprising means for supplying a continuous length of thermoplastic material having a planar section, a pusher for advancing the stacks of objects against said planar section and in a path perpendicular to the plane thereof, clamping means movable through a path parallel to the plane of said section into approximately an abutting relationship so as to complete encirclement of a stack with plastic material after advancement by said pusher, said clamping means including spaced opposed portions, and a heated wire element movable between the spaced portions of said clamping means so as to sever the plastic material pressed between said clamping means and to leave two welded regions, one welded region residing intermediate each set of opposed portions.

2. Apparatus for banding stacks of objects, comprising a pair of spaced rollers, a continuous supply of thermoplastic material with portions thereof entrained about each of said rollers, the spacing of said rollers providing an intermediate planar thermoplastic section, a pusher for advancing the stacks of objects against said planar section and in a path perpendicular to the plane thereof, two pairs of slightly spaced clamping bars movable toward each other from spaced locations corresponding in distance to the height of the stacks being banded through a path parallel to the plane of said section into approximately an abutting relationship so as to complete encirclement of a stack with plastic material after advancement by said pusher, and a heated wire element movable between the spaced bars of each pair of clamping bars to sever the plastic material pressed between said pairs of clamping bars and to leave a weld adjacent the opposed bars of each pair.

References Cited in the file of this patent
UNITED STATES PATENTS

| | | |
|---|---|---|
| 1,981,503 | Goeckeler, Jr. | Nov. 20, 1934 |
| 2,379,935 | Seiferth et al. | July 10, 1945 |
| 2,379,937 | Sloan | July 10, 1945 |
| 2,490,781 | Cloud | Dec. 13, 1949 |